INVENTORS
CLARENCE E. EARLE, AND
CARL A. COVINGTON,
BY Raymond W. Colton
ATTORNEY

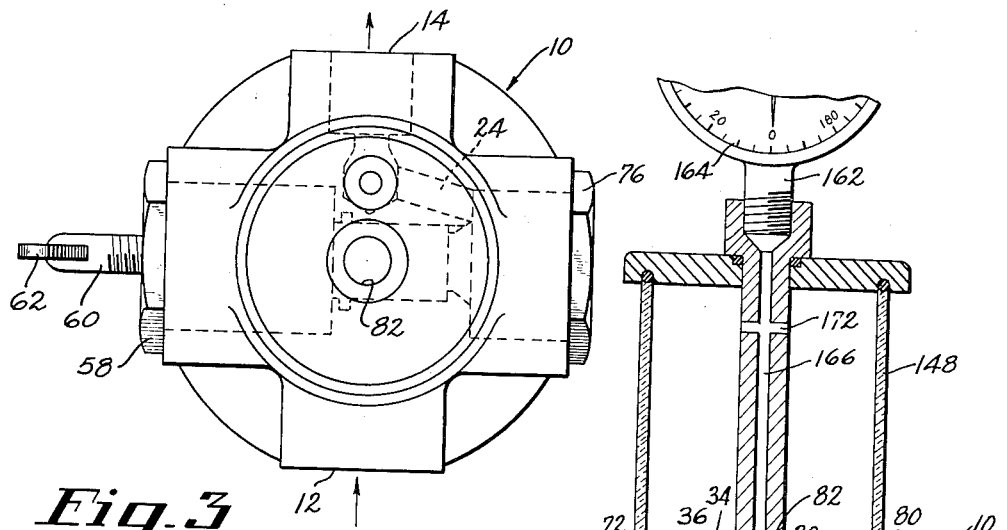
Fig. 3
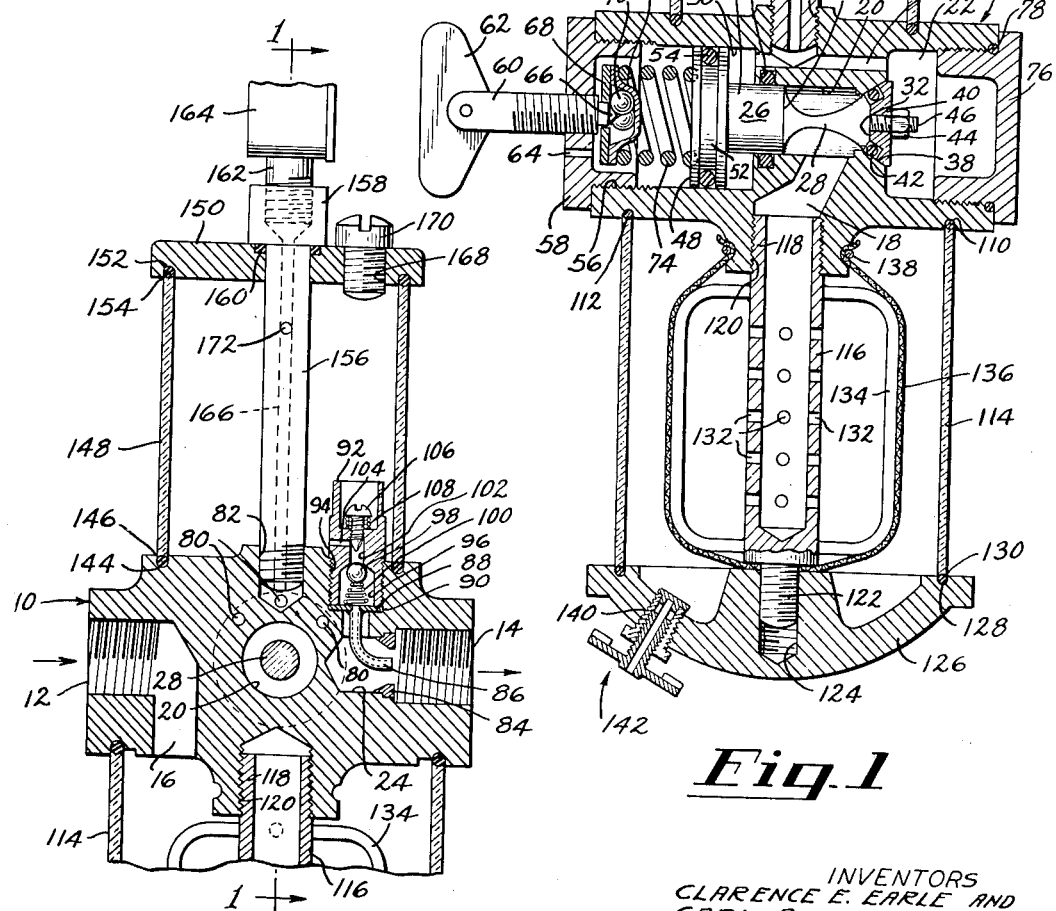
Fig. 1
Fig. 2
INVENTORS
CLARENCE E. EARLE AND
CARL A. COVINGTON,
BY Raymond Wheaton
ATTORNEY Jan. 10, 1956  C. E. EARLE ET AL  2,730,269
FLUID APPARATUS Filed April 14, 1949  2 Sheets-Sheet 2

United States Patent Office 2,730,269

Patented Jan. 10, 1956

2,730,269

FLUID APPARATUS

Clarence E. Earle, Washington, D. C., and Carl A. Covington, Alexandria, Va.; Dorothy B. Earle, executrix of said Clarence E. Earle, deceased Application April 14, 1949, Serial No. 87,476

12 Claims. (Cl. 222—193)

This invention relates to fluid apparatus primarily intended for the control and treatment of air under pressure.

It has been common in the past, to use pressure regulators, filters, and lubricators as separate components in compressed air lines. Such installations have required many joints and fittings and have been lacking in compactness which is particularly desirable in connection with portable systems.

It is an object of this invention to provide a single compact unit which can serve any one or combination of the functions of pressure regulation, filtering and lubricating. The fluid apparatus of the present invention comprises a valve casing having inlet and outlet ports, a fluid pressure controlled valve body in the casing interposed between the ports, the casing containing inlet and outlet passages between the ports respectively and the body, a seat provided on the casing for a housing adapted to define with the casing a chamber intermediate the inlet port and the body in series with the inlet passage, and a seat provided by the casing for a housing adapted to define with the casing a chamber communicable with the outlet passage intermediate the body and the outlet port. The valve body may be of a differential type, biased towards a valve closing position by inlet port fluid pressure, so that it will tend to interrupt the passage of fluid under certain conditions encountered in use. The valve body may likewise be biased towards a closed position by fluid pressure conditions in the inlet and outlet passages, and means including at least one spring interposed between the casing and the body serves to bias the latter towards an open position. Adjustment means for the spring biasing means will permit the effect upon the valve body to be varied in order that the pressure of the fluid can be regulated to any value desired within the limits of the biasing spring employed. The housings are preferably secured to the casing to define therewith the chamber intermediate the inlet port and the body and the chamber communicable with the outlet passage. The chamber intermediate the inlet port and the body in series with the inlet passage may receive filter means interposed in the path of fluid supplied from the inlet port to the valve body. The housing defining a chamber communicable with the outlet passage intermediate the body and the outlet port may receive lubricant, and eduction means responsive to fluid movement may be provided for feeding lubricant from the chamber to the outlet passage, and control means may be included for regulating the passage of lubricant from the chamber to the outlet passage.

The liquid chamber defined by the housing communicable with the outlet passage intermediate the body and the outlet port may communicate through a conduit with the outlet passage to maintain liquid in the chamber at outlet passage pressure. The valve body may have opposed surfaces of unequal areas exposed to inlet port fluid producing a differential effect tending to maintain the body in a closed position, combined with means connected with the body having a surface larger than either of the opposed surfaces exposed to outlet port fluid pressure for opposing the effect of the means biasing the body towards an open position. This larger surface exposed to outlet port fluid pressure may be a third surface integral with the valve body, and the biasing means may be compressible, adapting it to receive different settings to correspond with the different pressures to be attained.

In the event that the apparatus of the present invention is not required to serve a filtering function or a lubricating function, the housings intended for these purposes may be removed and replaced by covers which will protect the operating mechanism of the regulating valve.

A more complete understanding of the invention will follow from a detailed description of the accompanying drawings wherein:

Fig. 1 is a sectional elevation along line 1—1 of Fig. 2;

Fig. 2 is a sectional elevation at right angles to that shown in Fig. 1, and partially broken away;

Fig. 3 is a plan view of the apparatus with certain of the parts removed;

Figure 6:
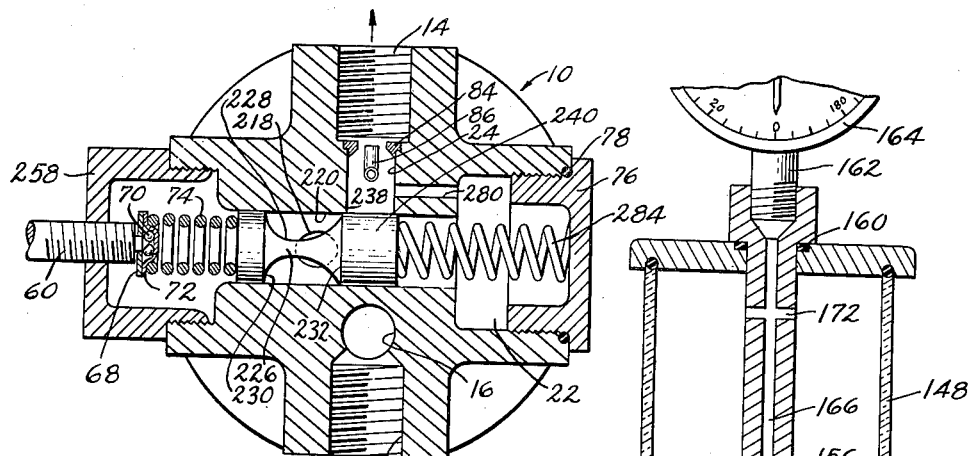
Fig. 6 is a section in plan taken along line 6—6 of Fig. 4.

A valve casing 10 contains a threaded inlet port 12 and a threaded outlet port 14. Fluid under pressure entering the inlet port 12 will flow through an inlet passage 16 extending to the lower face of the casing as viewed in Fig. 2, for interconnection with another portion 18 of the inlet passage extending upwardly from the central portion of the lower surface of the casing as viewed in Fig. 1 to the valve cylinder 20. Fluid released from the valve cylinder will enter the outlet chamber 22 which is connected by means of an outlet passage 24, shown in broken lines in Fig. 3, with the outlet port 14. A valve body 26 is received for reciprocatory movement in the cylinder 20, the body having a reduced portion 28 intermediate opposed surfaces 30 and 32 which are exposed to inlet port fluid pressure. The surface 30 exposed to such fluid pressure is somewhat larger than the surface 32 exposed to the pressure so that the valve body would tend to move towards the left as viewed in Fig. 1 were it subjected to no other influences. The cylinder 20 is counterbored near one end to receive a toroidal packing 34 which maintains a sealing engagement with the cylindrical extension 36 of the valve body. At its other end, the cylinder terminates in a frustoconical seat 38 for the complementary head 40 of the valve, whose face is grooved to receive a packing ring 42. The head 40 is secured to the body by means of a nut 44 received by the threads of a screw 46 carried by the body. The left end of the cylindrical stem 36 is secured to a piston 48 which is received for reciprocatory movement in a cylinder 50 formed in the left end of the valve casing as viewed in Fig. 1. The piston 48 is provided with an external groove 52 for the reception of a packing ring 54 which maintains a seal between the piston and its cylinder. The outer end of the cylinder 50 is provided with threads 56 for the reception of a threaded plug 58, which is in turn, centrally threaded to receive an adjusting screw 60 having a winged head 62. The plug is also provided with a perforation 64 so as to maintain the left end of the piston 48 at atmospheric pressure. The tapered end 66 of the adjusting screw 60 penetrates a plate 68 to engage a plurality of balls 70 carried by a cup 72 which is secured to the plate 68. Interposed between the cup 72 and the left end of the piston 48, there is a biasing spring 74 whose effect can be varied by adjustment of the screw 60.

The outlet chamber 22 formed at the right end of the casing as viewed in Fig. 1, is closed by a threaded plug 76 which carries a packing ring 78 for engagement with the end of the casing. The outlet chamber 22 and the cylinder 50 are maintained in communication by means of passages 80 extending parallel to the axis of the cylinder 20. The upper surface of the valve casing is provided with a central threaded opening 82 which communicates with the outlet chamber 22 and the cylinder 50 through one or more of the passages 80. Intermediate the outlet passage 24 and the outlet port 14 there is interposed an orifice forming member 84, securely seated in a counterbore provided in the casing, for cooperation with an eduction nozzle 86 mounted in a plate 88 which bears upon a shoulder 90 and is secured thereto by means of a threaded casing 92 received in a threaded opening 94 formed through the upper surface of the valve casing 10 for communication with the outlet passage 24. The lower end of the threaded casing 92 is formed with an enlarged counterbore 96 to receive a ball check 98 biased upwardly by means of a spring 100. An axial passage 102 above the ball 98 communicates with a transverse passage 104 formed through the wall of the threaded casing, the effective size of this passage being controlled by the setting of a threaded valve 106 which is maintained in any adjusted position by the aid of a spring 108 interposed between opposed surfaces of the valve and the threaded casing 92.

The lower surface of the valve casing 10 contains a groove 110 for the reception of a packing ring 112 to serve as a seat for a cylindrical housing wall 114. This housing wall surrounds a hollow stud 116 whose upper threaded end 118 is received in a threaded opening 120 extending from the lower surface of the valve casing to the portion 18 of the inlet passage. The closed outer end of the stud 116 is provided with threads 122 which are received in a threaded opening 124 of a cap 126 containing a groove 128 for a sealing ring 130 which bears upon the lower end of the housing wall 114. The hollow stud 116 is provided with a plurality of transverse openings 132 to interconnect the inlet port with the inlet passage portion 18. A plurality of spreader bars 134 of substantially U-shape are secured to the outer wall of the stud 116, serving to maintain in extended condition, a filter sleeve or bag 136 whose upper end is secured to the valve casing by means of a split ring 138, and whose lower end is secured between surfaces of the stud 116 and the cap 126. The cap is provided with a threaded opening 140 for the reception of a tubular blow-off valve 142.

The upper surface of the valve casing contains a groove 144 in which is seated a packing ring 146 for sealing engagement with the lower end of a housing wall 148. The upper end of the housing wall 148, is closed by a cap 150 containing a groove 152 in which is seated a packing ring 154 which is pressed between the surfaces of the cap and the upper end of the housing wall by means of a stud 156 whose lower threaded end is received in the threaded opening 82 formed in the upper surface of the valve casing. The upper end of the stud 156, is provided with a head 158 which bears upon the cap 150 through a sealing gasket 160, the upper end of the head 158 being internally threaded to receive a nipple 162 of a pressure gage 164 which communicates with the outlet chamber 22 of the valve casing, through an axial passage 166 formed through the stud. The cap 150, contains a threaded opening 168 to receive a filler plug 170 which will be in alignment with the valve 106 so that when the filler plug is removed, a screw driver may be inserted through the opening 168 for engagement with the head of the valve 106 to effect an adjustment thereof. A transverse opening 172 formed near the upper end of the stud 156 in communication with the axial bore 166, but within the housing, will serve to maintain pressure upon any liquid within the housing, at the pressure of the outlet chamber 22.

Assuming that the adjusting screw 60 has been backed off to an extent that the biasing spring 74 becomes ineffective upon the valve body 26, with the parts assembled as depicted in Fig. 1, when pressure is applied at the inlet port 12, fluid will flow through the inlet passage 16 into the housing 114, through the filter 136, through the transverse ports 132 of the hollow stud 116, into the inlet passage portion 18, to the cylinder 20, where it will be applied to the opposed surfaces 30 and 32, biasing the valve body towards the left, and maintaining it closed with respect to its seat 38. When the adjusting screw 60 is advanced so that the spring 74 imposes a biasing effect upon the valve body sufficient to overcome the differential between the opposed surfaces 30 and 32, the valve body will move towards the right, removing the head 40 from the seat 38, permitting fluid from the inlet port to pass through the valve into the outlet chamber 22. As pressure builds up in the outlet chamber 22, fluid will be distributed through the outlet passage 24 to the outlet port 14 and the tool or load for which the pressure is intended, and fluid pressure will also be developed through the passages 80 upon the proximate surface of the piston 48 to oppose the effect of the biasing spring 74. In the event that the pressure imposed upon the piston is in excess of that for which the adjusting screw 60 was set, the valve will close. If on the other hand, the pressure exerted upon the surface of the piston 48 is less than that for which the biasing spring 74 has been adjusted, the valve will remain open. Whatever the pressure in the outlet chamber 22 may be, it will be applied through the axial bore 166 of the hollow stud 156 to the pressure gage 164 and to the housing 148 through the transverse passage 172.

With lubricant in the housing 148 exposed to the fluid pressure of the outlet chamber 22, and the valve 106 retracted from its seat sufficiently to permit the flow of liquid through the transverse opening 104 and the axial opening 102 in the threaded casing member 92, the eduction effect of the orifice 84 and the eduction tube 86 will cause lubricant to enter the fluid stream at such times as the velocity effect is sufficient to overcome the force of the spring 100 bearing upon the ball 98. This ball will function to prevent reverse flow of lubricant under any conditions. It will also serve to prevent the passage of lubricant to the outlet port at any time that there is no actual passage of fluid through the casing.

Should there be no need for the lubricant in a particular application of the device, the stud 156 and the housing 148 can be removed as can the threaded casing 92, and a closure cap substituted in sealing engagement with the packing ring 146. Similarly, should there be no need for the filter in a particular application, the housing 114, stud 116 and the filter 136 can be removed and replaced by a dome or other form of closure in sealing engagement with the sealing ring 112 so long as communication will be maintained between the inlet passage 16 and the inlet passage portion 18 so that fluid can flow from the inlet port to the valve body.

Figures 4, 5:
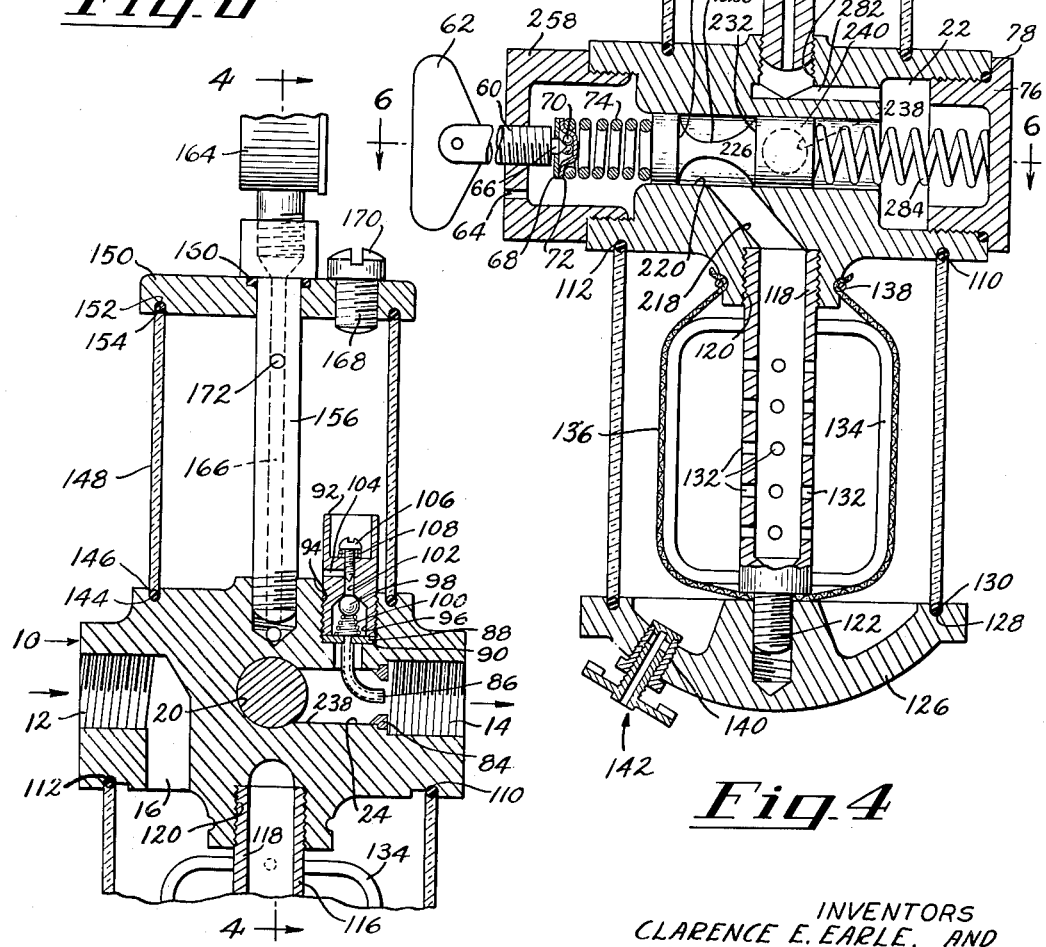
Fig. 4 is a sectional elevation along line 4—4 of Fig. 5 depicting a modified construction.
Fig. 5 is a sectional elevation at right angles to that shown in Fig. 4, and partially broken away.

Referring now to the modified structure shown in Figs. 4, 5 and 6 of the drawings wherein reference characters identical with those of the preceding figures have been employed for the identification of corresponding parts, the differences reside primarily in the valve body structure and operation and the arrangement of inlet and outlet passages. In these Figs. 4, 5 and 6, the valve body 226 comprises a reduced portion 228 intermediate opposed ends 230 and 232 having equal cross sectional areas exposed to inlet port fluid pressure communicated thereto through an inlet passage portion 218. With the valve body 226 in its closed position as depicted in Figs. 4 and 6, the equal and opposite effects of inlet port fluid pressure upon the surfaces 230 and 232 will be ineffective to disturb the position of the body. When the adjusting screw 60, carried in a threaded opening of a hollow plug 258, is advanced to increase the biasing effect of the spring 74 sufficiently to move the valve body 226 to the right in its cylinder 220, the head 240 of the body will uncover its port 238 formed through the cylinder wall, permitting fluid to flow through the outlet passage 24 and the orifice forming member 84 to the tool or other load for which the controlled fluid is intended. The outlet passage 24 communicates with the outlet chamber 22, through a passage 280 formed in the casing, subjecting the right end of the valve body to outlet pressure, which becomes effective to shift the body to the left against the force of the spring 74 whenever the outlet pressure builds up to a value exceeding that for which the adjusting screw 60 has been set. The outlet chamber 22 also communicates with the lubricant chamber defined by the housing wall 148, and the pressure gage 164, through a passage 282 formed in the casing to intersect the threaded opening 82 which receives the stud 156. Thus, outlet pressure will be effective to produce an indication on the gage and to balance the pressure effects upon any lubricant in the chamber provided therefor.

Under some conditions, it will be desirable to interpose a spring 284 between the head 240 of the valve body and the wall of the threaded plug 76, tending to close the valve when the adjusting screw 60 is retracted sufficiently to reduce the valve opening effect of the stronger spring 74 to a value below that produced by the weaker spring 284.

Although only illustrative forms of the invention have been shown and described, it will be clear to those skilled in the art, as it has been recognized already by the present inventors, that many modifications suggested by these examples can be made without departing from the invention as expressed in the appended claims.

We claim:

1. Fluid apparatus comprising a valve casing having inlet and outlet ports, means providing a valve chamber having a discharge opening in said casing, a differential valve body in said valve chamber interposed between said ports cooperable with said opening, said casing containing inlet and outlet passages between said ports respectively and said valve chamber, a housing separably secured to said casing defining a chamber intermediate and interconnecting said inlet port and said valve chamber in series with said inlet passage, and a second housing separably secured to said casing defining a chamber communicable with said outlet passage intermediate said body and said outlet port.

2. Fluid apparatus comprising a valve casing having inlet and outlet ports, means providing a valve chamber having a discharge opening in said casing, a differential valve body in said valve chamber interposed between said ports cooperable with said opening, said casing containing inlet and outlet passages between said ports respectively and said valve chamber, a housing secured to said casing defining a liquid chamber communicable with said outlet passage intermediate said body and said outlet port, eduction means responsive to fluid movement for feeding liquid from said chamber to said outlet passage, and control means for the passage of liquid from said chamber to said outlet passage.

3. Fluid apparatus comprising a valve casing having inlet and outlet ports, means providing a valve chamber having a discharge opening in said casing, a differential valve body in said valve chamber interposed between said ports and cooperable with said opening, said casing containing inlet and outlet passages between said ports respectively and said valve chamber, a housing secured to said casing defining a liquid chamber and passage communicable with said outlet passage intermediate said body and said outlet port, and means defining a conduit between said outlet passage and said chamber to maintain liquid in said chamber at outlet passage pressure.

4. Fluid apparatus comprising a valve casing having inlet and outlet ports, means providing a valve chamber having a discharge opening in said casing, a differential valve body in said valve chamber interposed between said ports and cooperable with said opening, said casing containing inlet and outlet passages between said ports respectively and said valve chamber, a housing secured to said casing defining a liquid chamber communicable with said outlet passage intermediate said body and said outlet port, connecting means maintaining liquid in said chamber at the pressure of said outlet passage, and eduction means feeding liquid from said chamber to said outlet passage responsive to fluid flow through said passage.

5. Fluid apparatus comprising a valve casing having inlet and outlet ports, means providing a valve chamber having a discharge opening in said casing, a differential valve body in said valve chamber interposed between said ports, cooperable with said opening and biased towards a closed position by inlet port fluid pressure, said casing containing inlet and outlet passages between said ports respectively and said valve chamber, a housing separably secured to said casing defining a chamber and passage intermediate said inlet port and said valve chamber in series with said inlet passage, and a second housing separably secured to said casing defining a chamber and passage communicable with said outlet passage intermediate said body and said outlet port.

6. Fluid apparatus comprising a valve casing having inlet and outlet ports, means providing a valve chamber having a discharge opening in said casing, a differential valve body in said valve chamber interposed between said ports and cooperable with said opening, said casing containing inlet and outlet passages between said ports respectively and said valve chamber, said body being biased towards a closed position by fluid pressure in said passages, a spring interposed between said casing and body for biasing said body towards an open position, a housing separably secured to said casing defining a chamber intermediate and interconnecting said inlet port and said valve chamber in series with said inlet passage, and a second housing separably secured to said casing defining a chamber communicable with said outlet passage intermediate said body and said outlet port.

7. Fluid apparatus comprising a valve casing having inlet and outlet ports, means providing a valve chamber having a discharge opening in said casing, a differential valve body in said valve chamber interposed between said ports, cooperable with said opening and biased towards a closed position by inlet port fluid pressure, said casing containing inlet and outlet passages between said ports respectively and said valve chamber, an adjustable spring interposed between said body and casing for biasing said body towards an open position, a housing separably secured to said casing defining a chamber intermediate and interconnecting said inlet port and said valve chamber in series with said inlet passage, and a second housing separably secured to said casing defining a chamber communicable with said outlet passage intermediate said body and said outlet port.

8. Fluid apparatus comprising a valve casing having inlet and outlet ports, means providing a valve chamber having a discharge opening in said casing, a differential valve body in said valve chamber interposed between said ports, cooperable with said opening and seeking a closed position responsive to inlet port fluid pressure, said casing containing inlet and outlet passages between said ports respectively and said valve chamber, biasing means tending to move said body to an open position in opposition to the effect of inlet port pressure, adjustment means for varying the effect of said biasing means, a housing separably secured to said casing defining a chamber intermediate and interconnecting said inlet port and said valve chamber in series with said inlet passage, and a second housing separably secured to said casing defining a chamber communicable with said outlet passage intermediate said body and said outlet port.

9. Fluid apparatus comprising a valve casing having inlet and outlet ports, means providing a valve chamber having a discharge opening in said casing, a differential valve body in said valve chamber interposed between said ports and cooperable with said opening, said casing containing inlet and outlet passages between said ports respectively and said valve chamber, a housing separably secured to said casing and defining therewith a chamber intermediate and interconnecting said inlet port and said valve chamber in series with said inlet passage, and a second housing separably secured to said casing defining therewith a chamber communicable with said outlet passage intermediate said body and said outlet port.

10. Fluid apparatus comprising a valve casing having inlet and outlet ports, means providing a valve chamber having a discharge opening in said casing, a fluid pressure controlled valve body in said chamber interposed between said ports and cooperable with said opening, means biasing said body towards an open position in opposition to outlet port pressure, said casing containing inlet and outlet passages between said ports respectively and said valve chamber, a seat provided by said casing for sealing engagement with a housing adapted to define therewith a chamber intermediate and interconnecting said inlet port and said valve chamber in series with said inlet passage, and a second seat provided by said casing for sealing engagement with a second housing adapted to define therewith a chamber communicable with said outlet passage intermediate said valve chamber and said outlet port.

11. Fluid apparatus comprising a valve casing having inlet and outlet ports, means providing a valve chamber having a discharge opening in said casing, a fluid pressure controlled valve body in said chamber interposed between said ports and cooperable with said opening, means biasing said body towards an open position in opposition to outlet port pressure, a spring opposing said biasing means tending to move said body towards a closed position, said casing containing inlet and outlet passages between said ports respectively and said valve chamber, a seat provided by said casing for sealing engagement with a housing adapted to define therewith a chamber intermediate and interconnecting said inlet port and said valve chamber in series with said inlet passage, and a second seat provided by said casing for sealing engagement with a second housing adapted to define therewith a chamber communicable with said outlet passage intermediate said valve chamber and said outlet port.

12. Fluid apparatus comprising a valve casing having inlet and outlet ports, means providing a valve chamber having a discharge opening in said casing, a fluid pressure controlled valve body in said chamber interposed between said ports and cooperable with said opening, means biasing said body towards an open position in opposition to outlet port pressure, adjusting means for said biasing means accessible externally of said casing, said casing containing inlet and outlet passages between said ports respectively and said valve chamber, a seat provided by said casing for sealing engagement with a housing adapted to define therewith a chamber intermediate and interconnecting said inlet port and said valve chamber in series with said inlet passage, and a second seat provided by said casing for sealing engagement with a second housing adapted to define therewith a chamber communicable with said outlet passage intermediate said valve chamber and said outlet port.

References Cited in the file of this patent
UNITED STATES PATENTS

| | | |
|---|---|---|
| 208,961 | Crosby | Oct. 15, 1878 |
| 646,428 | Hardie | Apr. 3, 1900 |
| 853,693 | Healey | May 14, 1907 |
| 1,131,341 | Dieter | Mar. 9, 1915 |
| 1,196,377 | Millea | Aug. 29, 1916 |
| 1,267,281 | Schneider | May 21, 1918 |
| 1,526,646 | Smith | Feb. 17, 1925 |
| 1,649,866 | Steiner | Nov. 22, 1927 |
| 1,903,248 | Spence | Mar. 28, 1933 |
| 2,067,229 | Birch | Jan. 12, 1937 |
| 2,239,502 | Gleason | Apr. 22, 1941 |
| 2,442,777 | Norgren | June 8, 1948 |
| 2,459,398 | Walters | Jan. 18, 1949 |